United States Patent [19]

Pernice et al.

[11] Patent Number: 5,210,125
[45] Date of Patent: May 11, 1993

[54] THOUGHENED THERMOPLASTIC COMPOSITIONS BASED ON POLYPHENYLENE ETHER AND POLYAMIDE

[75] Inventors: Roberto Pernice, Mestre-Venezia; Corrado Berto, Dolo; Alessandro Moro, Cazzago; Roberto Pippa, Noale, all of Italy

[73] Assignee: ECP Enichem Polimeri S.r.l., Milan, Italy

[21] Appl. No.: 923,327

[22] Filed: Jul. 31, 1992

[30] Foreign Application Priority Data

Aug. 5, 1991 [IT]  Italy ................ MI91 A/002206

[51] Int. Cl.$^5$ ................................. C08G 18/42
[52] U.S. Cl. ................................. 524/426; 524/427; 524/504; 525/66; 525/123
[58] Field of Search ............ 525/66, 123; 524/426, 524/427, 504

[56] References Cited

U.S. PATENT DOCUMENTS

| | | | |
|---|---|---|---|
| 1,385,168 | 7/1921 | Boker | 260/47 |
| 3,226,361 | 12/1965 | Horman | 525/212 |
| 3,234,183 | 2/1966 | Hay | 525/212 |
| 3,257,357 | 6/1966 | Stamatoff | 525/212 |
| 3,257,358 | 6/1966 | Stamatoff | 525/212 |
| 3,306,874 | 2/1967 | Hay | 525/212 |
| 3,306,875 | 2/1967 | Hay | 260/47 |
| 3,379,792 | 4/1968 | Finholt | 260/857 |
| 3,489,821 | 1/1970 | Witt et al. | 525/290 |
| 3,538,190 | 11/1970 | Meredith et al. | 525/289 |
| 3,671,608 | 6/1972 | Meredith et al. | 525/289 |
| 3,876,727 | 4/1975 | Meredith et al. | 525/282 |
| 3,914,266 | 10/1975 | Hay | 528/212 |
| 3,956,242 | 5/1976 | Olander | 528/212 |
| 3,962,181 | 6/1976 | Sakauchi et al. | 528/212 |
| 3,965,069 | 6/1976 | Olander | 528/212 |
| 4,028,341 | 6/1977 | Hay | 528/212 |
| 4,075,174 | 2/1978 | Olander | 528/212 |
| 4,093,595 | 6/1978 | Elliott | 528/219 |
| 4,093,596 | 6/1978 | Olander | 528/215 |
| 4,093,597 | 6/1978 | Olander | 528/212 |
| 4,093,598 | 6/1978 | Banucci et al. | 528/212 |
| 4,102,865 | 7/1978 | Olander | 528/212 |
| 4,184,034 | 1/1980 | Olander | 528/212 |
| 4,315,086 | 2/1982 | Ueno | 524/210 |
| 4,340,669 | 7/1982 | Bauer | 435/14 |
| 4,654,405 | 3/1987 | Jalbert et al. | 525/391 |

FOREIGN PATENT DOCUMENTS

| | | |
|---|---|---|
| 0024120 | 2/1981 | European Pat. Off. . |
| 0236596 | 9/1987 | European Pat. Off. . |
| 0270246 | 6/1988 | European Pat. Off. . |
| 0451563 | 10/1991 | European Pat. Off. . |
| 59066452 | 2/1981 | Japan . |
| 1213328 | 4/1984 | Japan . |
| 63-89565 | 4/1988 | Japan . |
| 8700540 | 1/1987 | PCT Int'l Appl. . |
| 8705311 | 9/1987 | PCT Int'l Appl. . |

Primary Examiner—Maurice J. Welsh
Attorney, Agent, or Firm—Shea & Gould

[57] ABSTRACT

Thoughened thermoplastic compositions are described having a good balance of mechanical, thermal and process properties, comprising:
at least a polyphenylene ether,
at least a polyamide,
an elastomeric copolymer containing a vinyl aromatic polymer grafted on an olefinic elastomer, and
an organic diisocyanate.

29 Claims, No Drawings

THOUGHENED THERMOPLASTIC COMPOSITIONS BASED ON POLYPHENYLENE ETHER AND POLYAMIDE

The present invention relates to a toughened thermoplastic composition based on a polyphenylene ether and a polyamide.

More in particular, the present invention relates to a thermoplastic composition having a good toughened balance of mechanical, thermal and process properties, as well as improved impact resistance, comprising a polyphenylene ether and a polyamide.

The polyphenylene ether resins (also known as polyphenylene oxide resins) represent a well known family of engineering polymers and are characterized by a good combination of thermal, mechanical and dielectrical properties within a wide temperature range. This combination of properties makes the polyphenylene ether resins suitable for use in a variety of applications by means of injection or extrusion molding techniques.

In spite of these numerous possible commercial applications of the polyphenylene ether resins (PPE), their utilization is limited due to their poor processability, mainly attributable to the low fluidity in the molten state which can cause some difficulties during the extrusion and injection molding operations.

A further drawback is that the polyphenylene ether resins show a poor solvent resistance after molding and a low resiliency (IZOD), thus the use thereof for certain applications is further limited.

To improve these shortcomings it has been suggested to blend the polyphenylene ether resins with other polymers which possess said lacking properties.

Thus, for example, U.S. Pat. No. 3,379,792 suggests to improve the fluidity of polyphenylene ether resins by adding a polyamide. According to the teachings of this patent, however, the blends are limited to a maximum polyamide concentration of 25% by weight, since higher amounts of polyamide involve delamination and a significant decay of the other physical-mechanical properties such as the resiliency.

Apart from this teaching, it is known from the literature that polyphenylene ether resins and polyamide resins are not fully compatible with each other within a wide range and that poor properties and phase separation occur when the polyamide concentration is rather high.

It is also known from the literature that for overcoming this drawback, substances which can interact with the resins, generally said compatibilizing agents, are added to the mixtures.

Thus, according to U.S. Pat. No. 4,315,086 and the corresponding European Patent No. 24,120, compositions comprising polyphenylene ether and a polyamide, showing high resilience characteristics and excellent processability, may be prepared by mixing the two polymers in the molten state with from 0.01 to 30% by weight of a compound selected from the group consisting of: a) a liquid diene polymer; b) an epoxy compound and c) a compound having both (i) an ethylenic double bond C=C or a triple bond C≡C, and (ii) a carboxy, anhydrido, amido, imido, carboxylic ester, amino or hydroxy group.

Japanese published Patent Application No. 84/66452 describes polymeric compositions similar to the preceding ones wherein the polyphenylene ether has been pretreated with one of the above reported compounds a) to c) in the presence of a free radical initiator.

However, the resulting compositions do not exhibit an excellent balance of properties and, furthermore, the resilience improvements are not yet sufficient.

With a view to further improving the characteristics thereof, it was proposed, in literature, that a rubber or an elastomeric polymer having a second order transition temperature (Tg) lower than 10° C. should be added to the polyphenylene ether-polyamide-compatibilizing agent compositions.

U.S. Pat. No. 4,315,086 proposes, to this purpose, to add natural rubbers, butadiene polymers, butadiene/styrene copolymers, isoprene polymers, butadiene/acrylonitrile copolymers, acrylic esters polymers, ethylene/propylene copolymers, ethylene/propylene/diene terpolymers, etc.

World Patent Application PCT/US/86/01511 and U.S. Pat. No.4,654,405 describe thermoplastic compositions comprising funzionalized polyphenylene ether, polyamide and an impact modifier such as e.g. a poly(styrene-b-butadiene-b-styrene) (S-B-S) three-block copolymer.

World Patent Application PCT/US/87/00479 describes thermoplastic compositions comprising functionalized polyphenylene ether, polyamide and an impact modifier consisting of a selectively and partially hydrogenated two-block copolymer of the A-B type, wherein block A is a styrene polymer and block B is an ethylene-propylene polymer.

European Patent Application No. 236,596 describes a polymeric composition comprising a polyphenylene ether, a polyamide, a compatibilizing agent and an agent to improve the impact strength of the blend selected from the group consisting of an ethylene-propylene copolymer or an ethylene-propylene-conjugated diene terpolymer, on which a polymer deriving from a vinyl monomer having an acid carboxylic group or a derivative thereof or an epoxy group in the molecule, has been grafted.

Laid-open European Patent Application No. 270246 describes a thermoplastic composition based on a polyphenylene ether and a polyamide containing from 5 to 100 parts, with respect to 100 parts of the blend, of a copolymer consisting of an ethylene-alpha-olefin rubbery copolymer, an alkenyl aromatic compound and an unsaturated carboxylic acid or an anhydride thereof, which, not only is compatible with the composition of the two polymers, but also causes a remarkable improvement of the impact strength. The presence of the unsaturated carboxylic acid or of its anhydride is considered, in said patent, as absolutely necessary.

Published Japanese Patent Application No. 1/213328 describes a resinous composition comprising polyphenylene ether and polyamide, to which a compound, containing at least a isocyanate group in the molecule, is added, as compatibilizing agent and in order to increase the thermal and tensile stress resistance.

The compositions described in the above mentioned known art, however, do not exhibit a best property combination for all the uses they are intended for.

The Applicant has now found that the use of particular elastomeric copolymers together with particular compatibilizing agents allow to achieve an excellent combination of properties.

According to the present invention, a thermoplastic composition based on polyphenylene ether and polyamide, having an excellent balance of thermal and mechanical properties, a good impact strength, a good flowability in the molten state, and therefore a good processability can be prepared by mixing to said resins:

an elastomeric copolymer containing a vinylaromatic polymer grafted on an olefinic elastomer,
an organic diisocyanate, More particularly, the subject matter of the present invention is a thermoplastic composition comprising:

(A) 5-95 parts with respect to 100 parts by weight of (A+B), of a polypolyphenylene ether;

(B) 95-5 parts with respect to 100 parts by weight of (A+B), of a polyamide;

(C) 1-100 parts with respect to 100 parts by weight of (A+B), of an elastomeric copolymer containing a vinyl aromatic polymer grafted on an olefinic elastomer;

(D) 1-10 parts with respect to 100 parts by weight of (A+B), of an organic diisocyanate.

The thermoplastic compositions of the instant invention preferably comprise the above components (A), (B), (C) and (D) in the following proportions:

(A) from 25 to 70% by weight of a polyphenylene ether;

(B) from 25 to 70% by weight of a polyamide;

(C) from 4.5 to 50% by weight of an elastomeric copolymer containing a vinylaromatic polymer grafted on an olefinic elastomer;

(D) from 0.5 to 3% by weight of an organic diisocyanate; the sum of the four components (A), (B), (C) and (D) being equal to 100.

The polyphenylene ethers (A) used in the compositions of the present invention are a well-known class of polymers. They are broadly utilized in the industry, especially as engineering polymers in appliances which require tenacity and thermal stability.

These polyphenylene ethers are polymers and copolymers which comprise a plurality of structural units having the following formula (I):

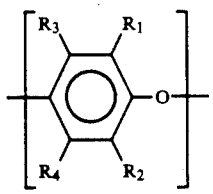

wherein $R_1$, $R_2$, $R_3$ and $R_4$, equal or different from each other, represent a hydrogen or halogen atom, or a substituted or non-substituted hydrocarbon radical, or $C_1$-$C_6$ alkoxide radical.

Examples of $R_1$, $R_2$, $R_3$ and $R_4$ are hydrogen, a halogen such as chlorine, bromine or fluorine, or a hydrocarbon radical containing from 1 to 18 carbon atoms such as for example an alkyl radical or a substituted alkyl radical such as methyl, ethyl, n- and iso-propyl, n-, sec- and tert- butyl, n-amyl, n-hexyl, 2,3-dimethylbutyl, chloro-ethyl, carboxy-ethyl, methoxycarbonylethyl, cyanoethyl, hydroxyethyl, phenylethyl, hydroxymethyl, or an aryl or substituted aryl radical such as phenyl, chlorophenyl, methylphenyl, dimethylphenyl, ethylphenyl, or a benzyl radical or an allyl radical, or, finally, an alkoxide radical containing from 1 to 6 carbon atoms, such as methoxide, ethoxide, n- and iso-propoxide, n-, iso- and tert-butoxide.

These polymers and the processes for preparing them are broadly described in literature. As an example, reference is made to U.S. Pat. Nos. 3,226,361; 3,234,183; 3,306,874; 3,306,875; 3,257,357; 3,257,358; etc., the content of which is incorporated in the present specification as a reference.

Polyphenylen ethers preferred in the present invention are those having general formula (II):

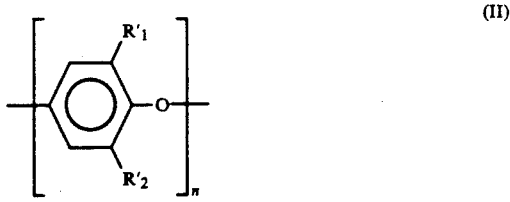

wherein $R_1$ and $R_2$, independently from each other, are an alkyl radical containing from 1 to 4 carbon atoms and n is at least 50 and preferably comprised between 60 and 600.

Illustrative examples of polyphenylene ethers which are particularly suitable for the compositions of the present invention are:

poly(2,6-dimethyl-1,4-phenylene)ether;
poly(2,6-diethyl-1,4-phenylene)ether;
poly(2-methyl-6-ethyl-1,4-phenylene)ether;
poly(2,6-dipropyl-1,4-phenylene)ether;
poly(2-ethyl-6-propyl-1,4-phenylene)ether and the like;

poly(2,6-dimethyl-1,4-phenylene)ether is particularly preferred.

The term "polyphenylene ether", whenever used in the present specification and in the claims, includes both the homopolymers and the copolymers containing the structural units of formula (I) indicated hereinbefore, such as, e.g., the copolymers comprising units deriving from 2,6-dimethyl phenol and 2,3,6-trimethyl phenol; as well as the grafted copolymers prepared by grafting one or more vinyl monomers such as acrylonitrile or vinylaromatic compounds such as styrene or polymers such as polystyrene or elastomers onto the polyphenylene ether chain.

The polyphenylene ethers generally have a average molecular weight determined by gel permeation chromatography, ranging from 5,000 to 120,000, and their inherent viscosity is higher than 0.1 dl/g and very often ranges from 0.30 to 0.90 dl/g (measured in chloroform at 23° C.).

These polyphenylene ethers can be produced by oxidation of a phenol compound with oxygen or an oxygen-containing gas, in the presence of a catalyst for the oxidative coupling. Any known catalyst suitable for the oxidation polymerization can be utilized. Generally they contain at least a compound of a transition metal such as copper, manganese or cobalt usually in combination with other types of catalytic compounds. Examples of suitable catalysts are the ones containing a cupreous or cupric salt such as, for example, a cuprous salt in combination with a tertiary amine and/or a secondary amine, such as, for example, copper(I)chloride-trimethylamine or copper(I)chloride-dibutylamine, or copper(I)chloride-pyridine, or copper(I)acetate-triethylamine, or a cupric salt in combination with a tertiary amine and a hydroxide of an alkaline metal, such as, for example, copper(II)chloride-pyridine/potassium hydroxide. These catalysts are described, for example, in U.S. Pat. Nos. 3,306,874; 3,914,266 and 4,028,341. Another class of suitable catalyst are the ones containing manganese or cobalt, very often complexed with one or more chelating and/or complexing agents such as dialkylamines, alkanoamines, alkylenediamines, o-hydroxyaromatic aldehydes, o-hydroxyazo compounds, omega-hydroxy-oximes, o-hydroxy-aryl-oximes and beta-diketones. All these catalysts are well known in literature and are described, for examples, in U.S. Pat. Nos. 3,956,242; 3,962,181; 3,965,069; 4,075,174; 4,093,595-8; 4,102,865; 4,184,034; 1,385,168; etc.

The polyamides (B) which are suited to prepare the compositions of the present invention can be prepared by any method generally used for this end, such as, for example, by polymerization of monoamino-monocarboxilic acids or the corresponding lactams having at least two carbon atoms between the amino group and the carboxilic group; or by polymerization of substantially equimolar amounts of a diamine, which contains at least two carbon atoms between the aminic groups, and a bicarboxilic acid; or also by polymerization of a monoamino-monocarboxylic acid or a lactam thereof, as above defined, along with a substantially equimolar amount of a diamine and of a dicarboxilic acid. The dicarboxilic acid can be utilized in the form of a derivative thereof such as, for example, an ester or an acid chloride.

The term "substantially equimolar" is used to designate both strictly equimolar amounts and little deviations therefrom, as it is required by the conventional techniques in order to stabilize the viscosity of the resulting polyamides.

Examples of monoamino-monocarboxylic acids or lactams thereof, which are utilizable for preparing the polyamides, comprise the compounds containing from 2 to 16 carbon atoms between the aminic group and the carboxylic group, said carbon atoms forming a ring including also the -CO-NH- group in the case of lactams. Examples of lactams and monoamino-monocarboxylic acids which can be used for the objects of the present invention are: butyrolactam, pivalolactam, caprolactam, capryl-lactam, undecanolactam, dodecanolactam, Ω-aminocaproic acid, 3- and 4-amino-benzoic acid, etc.

Diamines which are suitable for being utilized in the preparation of the polyamides comprise aliphatic alkyldiamines having a straight or branched chain, aryldiamines and alkylaryl-diamines.

Examples of diamines are the ones having the following general formula (III):

$$H_2N-(CH_2)_p-NH_2 \qquad (III)$$

wherein p is an integer ranging from 2 to 16, such as trimethylene diamine, tetramethylene diamine, pentamethylene diamine, octamethylene diamine and, particularly, hexamethylene diamine, as well as meta-phenylene diamine, meta-xylilene diamine and the like.

The dicarboxylic acids can be either aliphatic or aromatic. Among the aromatic acids, isophthalic acid and terephthalic acid are to be cited. Among the aliphatic acids there are preferred those having the following general formula (IV):

$$HOOC-R-COOH \qquad (IV)$$

wherein R is a divalent aliphatic group containing at least 2 carbon atoms and, preferably, from 2 to 18 carbon atoms, such as e.g. sebacic acid, octadecandioic acid, suberic acid, pimelic acid and adipic acid.

Typical examples of polyamides (usually called nylon) which can be used in the present invention are: nylon 6, nylon 6,6, nylon 11, nylon 12, nylon 6,3, nylon 6,4, nylon 6,10, nylon 6,12.

Partially aromatic polyamides too can be utilized in the compositions of the present invention. The term "partially aromatic polyamides" means those polyamides which are obtained by substituting, in part or in whole, an aliphatic residue of an aliphatic nylon with an aromatic residue.

For example, the polyamides resulting from terephthalic and/or isophthalic acid and trimethyl-hexamethylenediamine, from adipic acid and meta-xylilene diamine, from adipic acid or azelaic acid and 2,2-bis-(p-aminocyclohexyl)propane, or from terephthalic acid and bis(4-aminocyclohexyl)methane.

Mixtures and/or copolymers of two or more of the above polyamides or of prepolymers thereof can be used as well.

Preferred polyamides are nylon 6, nylon 6,6, nylon 11 and nylon 12; more particularly, nylon 6 and nylon 6,6.

The term "polyamide", whenever used in the present specification and in the claims, also comprises the block polyamides of the type A-B and A-B-A, in which A is a polyamide block and B is a polyalkylene glycol block.

The average molecular weight of the polyamides is advantageously higher than 10,000, and preferably higher than 15,000 and up to 60,000, and the melting point thereof is preferably higher than 200° C.

The elastomeric copolymer (C) containing a vinyl aromatic polymer grafted on the olefinic elastomer, which is suitable for preparing the compositions of the present invention, can be prepared by any known method for obtaining grafted copolymers, such as, for example, by radicalic or anionic polymerization of a vinyl aromatic monomer in the presence of the olefinic elastomer, or by a reaction between a polymer or prepolymer of a vinyl aromatic monomer and the olefinic elastomer, by means of either compounds generating free radicals, or functional reactive groups, previously added to the polymeric chains.

The grafting methods of vinyl or vinyl aromatic polymers on an olefinic substrate are well known and described, for example, in U.S. Pat. Nos. 3,489,821, 3,538,190, 3,671,608, 3,876,727 and 4,340,669.

The radicalic polymerization of a vinyl aromatic monomer in the presence of the olefinic elastomer, thermally, chemically or by radiations started, is the preferred grafting method.

The vinyl aromatic polymer content in the elastomeric copolymer (C) is generally higher than 1% by weight, and preferably it is comprised between 30% and 60% by weight, with respect to the total weight of the elastomeric copolymer.

The olefinic elastomer which the vinyl aromatic polymer is grafted on, is a rubbery copolymer, having a Mooney viscosity ranging from 10 to 150 ML-4 at 100° C., of at least two different straight chain α-mono-olefins such as ethylene, propylene, butene-1, octene-1, and the like with at least another copolymerizable monomer, generally a polyene, and typically a non conjugated diene. Preferably one of the α-mono-olefins is ethylene togheter with another α-mono-olefin having a longer chain. The ethylene weight ratio to the other α-mono-olefin in the rubbery copolymer is usually in the range of from 20/80 to 80/20. Particularly preferred copolymers are the ethylenepropylene-non conjugated diene terpolymer in which the non-conjugated diene can be cyclic or acyclic such as: 5-methylene-2-norbornene, 5-isopropylidene-2-norbornene, 1,4-pentadiene, 1,4-hexadiene, 1,5-hexadiene, 1,5-heptadiene, 1,7,9-dodecatriene, methyl-1,5-eptadiene, 2,5-norbornadiene, cyclo-1,5-octadiene, dicyclopentadiene, tetrahydroindene, 5-methyltetrahydroindene, etc. The diene content ranges from about 2 to 20% by weight and, preferably, from 8 to 18% by weight of diene monomeric units in the rubbery terpolymer. Particularly interesting results are obtained by using a rubbery terpolymer having a Mooney viscosity, determined at 100° C., ranging from 30 to 90 ML-4, and a iodine number higher than 5, preferably ranging from 10 to 40.

The term "vinyl aromatic polymer", whenever used in the present specification and in the claims, comprises the polymers obtained by polymerization of ethylenically unsaturated compounds having the following general formula (V):

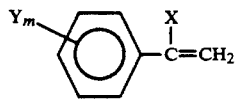
(V)

wherein:

X represents a hydrogen atom or an alkyl radical having from 1 to 4 carbon atoms;

Y represents a hydrogen or a halogen atom or an alkyl radical having from 1 to 4 carbon atoms and m is 0 or an integer comprised between 1 and 5.

Examples of vinyl aromatic monomers having the above-reported general formula are: styrene; methylstyrene; mono-, di-, tri-, tetra-, and penta-chlorostyrene and the corresponding α-methyl-styrenes; styrenes and α-methylstyrenes which are alkylated in the nucleus such as ortho- and paramethylstyrenes; ortho- and para ethylstyrenes; ortho- and para-methyl-α-methylstyrenes, etc. These monomers can be utilized either alone or in admixture with one another.

For the objects of the present invention it is understood that in the preparation of the elastomeric copolymer, not all the vinyl aromatic polymer is really grafted on the olefinic elastomer, but a portion thereof remains free in physical admixture with the grafted elastomer.

The amount of vinyl aromatic polymer really grafted on the olefinic elastomer is not critical and generally ranges from 10 to 50% by weight with respect to the total weight of the grafted elastomer; while the amount of free vinyl aromatic polymer ranges from 10 to 50% by weight with respect to the elastomeric copolymer. The amounts of grafted vinyl aromatic polymer and of free vinyl aromatic polymer can be determined by extraction of the elastomeric copolymer with a solvent in which only the free polymer is soluble.

Preferably, the average molecular weight of the vinyl aromatic polymer favourably influences the impact strength characteristics of the mixtures. Thus, for example, good impact strength results are obtained with vinylaromatic polymers having a molecular weight higher than 100,000 and up to 2,000,000, preferably higher than 400,000 and up to 1,800,000.

The amount of the elastomeric copolymer (C) can be up to 100 and, preferably, range from 4.5 to 50 parts by weight on 100 parts by weight of the polyphenylene ether-polyamide (A+B) mixture. Amounts lower than 4.5 parts by weight have a negligible effect on the impact strength of the compositions; while, amounts higher than 100 parts by weight strongly improve the impact strength, but to the detriment of other properties. Thus, in order to obtain compositions having an excellent balance of properties it is advisable to maintain the olefinic elastomer content below 100 parts by weight and preferably below 50 parts by weight, always referred to 100 parts of polyphenylene ether and polyamide.

For the objects of the present invention, any organic aliphatic, cycloaliphatic and/or aromatic diisocyanate (D) can be utilized. Typical aromatic diisocyanates which can be utilized are those corresponding to the following general formula (VI):

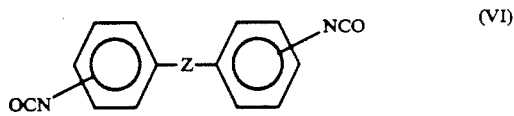
(VI)

wherein Z can be $-SO_2-$, $-\overset{\overset{O}{\|}}{C}-$, $-S-$, $-O-$ or the group 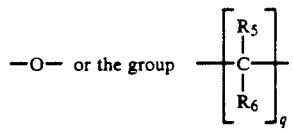

wherein $R_5$, $R_6$, which can be equal or different from each other, can be a hydrogen atom or an alkyl group containing from 1 to 4 carbon atoms, and "q" is 0 or an integer ranging from 0 to 4.

The aromatic diisocyanates which can be utilized for the purposes of the present invention include: ortho-, meta- and para-phenylenediisocyanate, 2,4-toluenediisocyanate, 2,6-toluenediisocyanate and the several naphtalenediisocyanate isomers as well as the 4,4'-di-phenylenediisocyanate modified with carbodiimide, etc.

Among the aromatic diisocyanates, 2,4'- and 4,4'-(diphenyle-methane)diisocyanate and 2,4- and 2,6-toluenediisocyanate are preferred.

Aliphatic and/or cycloaliphatic diisocyanates suitable for the present invention are the ones containing from 2 to 20 carbon atoms comprised between the two isocyanic groups. Said diisocyanates include:tetramethylenediisocyanate, hexamethylenediisocyanate, decamethylenediisocyanate, isophoronediisocyanate, all the cyclohexanediisocyanate and methylcyclohexanediisocyanate isomers, methylene-bis-(4-cyclohexyl-diisocyanate), etc.

The diisocyanates which can be utilized in the present invention can also be blocked diisocyanates in order to make them less reactive during operations such as, for example, the packaging and the blending or during the storing; they can be blocked with several agents such as, for example, alcohols, diols, phenols, lactams, carbamates, ureas (biuretized), etc.

The term "organic diisocyanate" whenever used in the present invention, include also the blends of the above reported diisocyanates, among themselves and/or with lower amounts of mono- or polyisocyanates, in order to set up, in this latter case, the processability characteristics of the compositions of the present invention.

In addition to components A, B, C and D, the compositions of the present invention can contain reinforcing additives such as for example glass fibres, carbon fibres, organic and inorganic high-modulus fibres, metal fibres, inorganic fillers, etc., as well as antiflame agents, dyestuffs, pigments, stabilizers, lubricants, etc., which are well-known to those skilled in the art.

Particularly preferred reinforcing additives are the glass fibres, which can be untreated or, better, treated with silanes or titanates, as it is well-known to the technicians and to the manufacturers of said fibres.

The reinforcing additives can be used in amounts generally not exceeding 50% by weight and, preferably, not higher than 30% by weight calculated on the total composition.

Suitable stabilizers to be used in the compositions of the present invention comprise many of the known thermal stabilizers and antioxidant which are suitable and generally utilized for polyamides, polyphenylene ether resins or elastomers. For example, liquid phosphates and hindered phenols can be added to the compositions of the present invention, in amounts which can range from 0.05 to 5% by weight with respect to the total composition.

The method for producing the compositions of the present invention is not critical and any conventional method is utilizable.

Generally, the mixing is carried out in the molten state, and time and temperature are selected and determined time-to-time as a function of the composition. The temperatures are generally in the range of from 200 to 300 C. Any known mixing unit can be utilized. The method can be continuous or discontinuous. Specifically, single-screw and two-screw extruders, Banbury mixers, mixing rollers and the like can be used.

Although all the composition components can be introduced at the beginning and directly into the mixing unit, in some cases it is preferable to completely or partially pre-mix one of the two resins, preferably polyphenylene ether, with the elastomeric copolymer. At the same way, it is usually preferable to disperse the organic diisocyanate into the polyphenylene ether at the start of the composition preparation.

The compositions subject matter of the present invention are easily processable by injection molding or by extrusion and exhibit a complex of properties which make them suited to be utilized for the manufacture of shaped articles having a high impact strength along with a good thermal stability and a low water sensitivity. Thanks to these properties, the composition of the present invention can be used in the automotive sector, for the manufacture of articles which can be furnace-painted, parts which enter into contact with motors, houshold electric apparatus, electronic articles and technical articles in general in the form of cups, boxes, containers, panels, sheets, rods, etc.

In order to better understand the present invention and to reduce it to practice, a few illustrative examples are given hereinafter, which however are not limitative of the scope of the invention.

The characterization of the compositions as reported in the examples, was carried out according to the following methods and standards:

Impact resistance (IZOD), determined at 23° C., according to standard ASTM D 256, on 3.2 mm thick specimens with notch.

Softening temperature or VICAT, determined at 5 kg in oil, according to standard ISO 306.

EXAMPLE 1

Premixing of the Polyphenylene Ether with the Diisocyanate

Into a powder mixer, 49 parts of poly(2,6-dimethyl-1,4-phenylen)ether (PPE) as white powder, having an intrinsic viscosity of 0.47 (in chloroform at 23 C), and 1 part of solid crystalline 4,4'-methylenediphenylediisocyanate (MDI), were introduced, at room temperature. During the mixing, the methylenediphenylediisocyanate melted and uniformly dispersed into the PPE powder.

Preparation of the Composition

Into a BRABENDER plastograph, equipped with a 50 ml cell and heated at 240° C., there was introduced a mixture, prepared at room temperature, consisting of:

70% by weight of PPE premixed with MDI as above;

30% by weight of an elastomer grafted with styrene (EPDM-g-PST) having the following composition: 40% by weight of EPDM (Mooney viscosity 62-72 ML-4 at 100° C. and a iodine number 18), 28% by weight of grafted styrene and 32% by weight of styrene in the form of homopolymer, having a weight average molecular weight (Mw) 1,119,000, blended with said rubber.

The BRABENDER mastication speed was programmed according to a cycle of 50-120-50 r.p.m. and the residence time of the mixture in the plastograph was of 4 minutes.

A mixture consisting of the following component was then fed to a second plastograph BRABENDER of the same type of the first one and used in the same operative conditions:

33.3% by weight of the mixture leaving the first plastograph constituted by 70% of PPE premixed with MDI and 30% of EPDM elastomer grafted with styrene;

41% by weight of nylon 6 produced by the firm Montedipe S.r.l. under the trademark "TERNIL® B 27" (PA B-27), having an average molecular weight of 18,000, and 25.7% by weight of PPE premixed with MDI as above.

The resulting composition was ground, compression molded at 260° C. and characterized.

The characterization results are listed in Table 1.

EXAMPLE 2 (COMPARISON TEST)

A composition was prepared by using the same components and proportions and the same processing conditions of example 1, except that pure PPE was used, namely PPE not premixed with MDI.

The resulting composition was ground, compression molded at 260° C. and characterized. The characterization results are listed in Table 1.

EXAMPLE 3 (COMPARISON TEST)

The polyphenilene ether PPE was premixed with the diisocyanate MDI in the same proportions and with the same process modalities reported in example 1.

Into a BRABENDER plastograph of the same type used in example 1, and used in the same processing conditions there wa then introduced a mixture constituted by the following components:

45% by weight of nylon 6 produced by the firm Montedipe S.r.l. under the trademark "TERNIL® B 27"

(PA B-27), having an average molecular weight of 18,000;

55% by weight of poly(2,6-dimethyl-1,4-phenylene)ether premixed with 4,4'-methylenediphenyldiisocyanate as above.

The resulting composition was ground, compression molded at 260° C. and characterized. The characterization results are listed in Table 1.

TABLE 1

| PARAMETERS | EXAMPLE 1 | EXAMPLE 2 | EXAMPLE 3 |
|---|---|---|---|
| PPE (%) | 48,5 | 49 | 54 |
| PA (B-27) (%) | 41,6 | 41 | 45 |
| MDI (%) | 1,0 | — | 1 |
| EPDM-g-PST (%) | 9,9 | 10 | — |
| VICAT 5Kg (°C.) | 186 | 178 | 197 |
| IZOD (J/m) | 103 | 28 | 57 |

We claim:

1. Thermoplastic toughened composition comprising:
   (A) 5-95 parts with respect 100 parts by weight of (A+B), of a polyphenylene ether;
   (B) 95-5 parts with respect to 100 parts by weight of (A+B), of a polyamide;
   (C) 1-100 parts with respect to 100 parts by weight of (A+B), of an elastomeric copolymer containing a vinyl aromatic polymer grafted on an olefinic elastomer; and
   (D) 1-10 parts with respect to 100 parts by weight of (A+B), of an organic diisocyanate.

2. Thermoplastic composition according to claim 1, comprising the following proportions of components (A), (B), (C), and (D) with respect to the total composition:
   (A) from 25 to 70% by weight of a polyphenylene ether;
   (B) from 25 to 70% by weight of a polyamide;
   (C) from 4.5 to 50% by weight of an elastomeric copolymer containing a vinyl aromatic polymer grafted on an olefinic elastomer;
   (D) from 0.5 to 3% by weight of an organic diisocyanate; the sum of the four components (A), (B), (C) and (D) being equal to 100.

3. Thermoplastic composition according to claim 1, wherein the vinyl aromatic polymer content in the elastomeric copolymer (C) is higher than 1% by weight, with respect to the total weight of the elastomeric copolymer.

4. Thermoplastic composition according to claim 1, wherein the olefinic elastomer is a rubbery copolymer, having a Mooney viscosity ranging from 10 to 150 ML-4 at 100° C., of at least two different straight chain one-mono-olefins with at least a copolymerizable polyene.

5. Thermoplastic composition according to claim 4, wherein the rubbery copolymer includes ethylene together with another α-mono-olefin, and the weight ratio between the ethylene and the other α-mono-olefin is in the range of from 20/80 to 80/20.

6. Thermoplastic composition according to claim 1, wherein the olefinic elastomer is an ethylene-propylene-non conjugated diene terpolymer, having a diene content ranging from 2 to 20% by weight.

7. Thermoplastic composition according to claim 6, wherein the ethylene-propylene-non-conjugated diene has a Mooney viscosity, determined at 100° C., ranging from 30 to 90 ML-4, and a iodine number higher than 5.

8. Thermoplastic composition according to claim 1, wherein the vinyl aromatic polymer in the elastomeric copolymer is obtained by polymerization of one or more compounds having the following general formula (V):

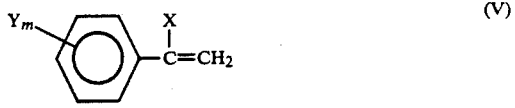

wherein:
X represents a hydrogen atom or an alkyl radical having from 1 to 4 carbon atoms;
Y represents a hydrogen or a halogen atom or an alkyl radical having from 1 to 4 carbon atoms and m is 0 or an integer comprised between 1 and 5.

9. Thermoplastic composition according to claim 1, wherein the vinyl aromatic polymer is partially grafted on the olefinic elastomer and partially is free in physical admixture with the grafted elastomer.

10. Thermoplastic composition according to claim 9, wherein the vinyl aromatic polymer molecular weight is higher than 100,000 and up to 2,000,000.

11. Thermoplastic composition according to claim 9, wherein the amount of grafted vinyl aromatic polymer ranges from 10 to 50% by weight with respect to the weight of the grafted elastomer, and the amount of free polymer ranges from 20 to 50% by weight, with respect to the elastomeric copolymer.

12. Thermoplastic composition according to claim 1, wherein the polyphenylene ether is a polymer or a copolymer containing a plurality of structural units having the following formula (I):

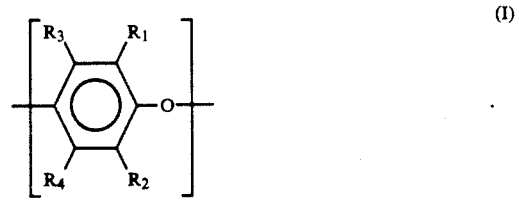

wherein $R_1$, $R_2$, $R_3$ and $R_4$, equal or different from each other, represent a hydrogen or halogen atom, or a substituted or non-substituted hydrocarbon radical, or a $C_1$-$C_6$ alkoxide radical.

13. Thermoplastic composition according to claim 12, Wherein the polyphenylene ether has the following formula (II):

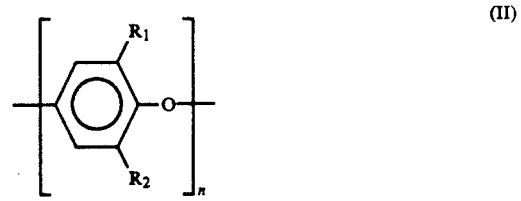

wherein $R_1$ and $R_2$, independently from each other, are an alkyl radical containing from 1 to 4 carbon atoms and "n" is at least 50.

14. Thermoplastic composition according to claim 1, wherein the polyphenylene ether is poly(2,6-di-methyl-1,4-phenylene)ether having a number average molecular weight ranging from 5,000 to 120,000 and an inherent viscosity higher than 0.1 dl/g (measured in chloroform at 23° C.).

15. Thermoplastic composition according to claim 1, wherein the polyamide is nylon 6 or nylon 6,6.

16. Thermoplastic composition according to claim 1, wherein the organic diisocyanate is an aromatic, aliphatic and/or cycloaliphatic diisocyanate.

17. Thermoplastic composition according to claim 1, wherein the organic diisocyanate is premixed wit the polyphenylene ether.

18. Thermoplastic composition according to claim 16, wherein the organic diisocyanate is selected from 2,4′-diphenylmethane-diisocyanate, 4,4′-diphenylmethane-diisocyanate, 2,4-toluene diisocyanate 2,6-toluene diisocyanate.

19. Thermoplastic composition according to claim 1, further comprising reinforcing additives, antiflame agents, dyestuffs, pigments, stabilizers, and/or lubricants.

20. Thermoplastic composition according to claim 19, wherein the reinforcing additive is selected from the group consisting of glass fibres, carbon fibres, organic or inorganic high modulus fibres, or metal fibres, in amounts not exceeding 50% by weight calculated on the total composition.

21. A thermoplastic composition according to claim 3, wherein the vinyl aromatic polymer content in the elastomeric copolymer (C) is between 30% and 60% by weight.

22. A thermoplastic composition according to claim 4, wherein the copolymerizable polyene is a non-conjugated diene.

23. A thermoplastic composition according to claim 6, wherein the diene content is from 8 to 18% by weight.

24. A thermoplastic composition according to claim 7, wherein the ethylene-propylene-non-conjugated diene has an iodine number from 10 to 40.

25. A thermoplastic composition according to claim 10, wherein the amount of grafted vinyl aromatic polymer ranges from 10 to 50% by weight with respect to the weight of the grafted elastomer, and the amount of free polymer ranges from 20 to 50 by weight, with respect to the elastomeric copolymer.

26. A thermoplastic composition according to claim 13, wherein "n" is between 60 and 600.

27. A thermoplastic composition according to claim 14, wherein the polyphenylene ether has an inherent viscosity between 0.30 and 0.90 dl/g.

28. A thermoplastic composition according to claim 17, wherein the organic diisocyanate is selected from 2,4′-diphenylmethane-diisocyanate, 4,4′- di-phenylmethane-diisocyanate, 2,4-toluene diisocyanate, and 2,6-toluene diisocyanate.

29. A thermoplastic composition according to claim 20, wherein the amount of reinforcing additive does not exceed 30% by weight.

* * * * *

UNITED STATES PATENT AND TRADEMARK OFFICE
CERTIFICATE OF CORRECTION

PATENT NO. : 5,210,125
DATED : May 11, 1993
INVENTOR(S) : Roberto Pernice et al.

It is certified that error appears in the above-indentified patent and that said Letters Patent is hereby corrected as shown below:

Column 11:
In Claim 4, in line 5, "one-mono-olefins" should read as
-- -mono-olefins--;
Column 11:
In Claim 4, in line 4, "a" should read as --one--;
Column 13:
In Claim 17, in line 2, "wit" should read as --with--; and
Column 13:
In Claim 18, in lne 4, after "2,4-toluene diisocyanate" and before "2,6-toluene", the word "and" should be added.

Signed and Sealed this

Seventh Day of June, 1994

Attest:

BRUCE LEHMAN

*Attesting Officer*     *Commissioner of Patents and Trademarks*